(12) United States Patent
Goettker (10) Patent No.: US 7,461,856 B2
(45) Date of Patent: Dec. 9, 2008

(54) TRAILER COUPLER

(76) Inventor: Bernhardt Goettker, 14195 Ridge Canyon Rd., Valley Center, CA (US) 92082

( * ) Notice: Subject to any disclaimer, the term of this patent is extended or adjusted under 35 U.S.C. 154(b) by 0 days.

(21) Appl. No.: 11/186,195

(22) Filed: Jul. 19, 2005

(65) Prior Publication Data

US 2007/0018430 A1    Jan. 25, 2007

(51) Int. Cl.
  *B60D 1/06*    (2006.01)
(52) U.S. Cl. ...................................................... 280/513
(58) Field of Classification Search ................. 280/511, 280/513
See application file for complete search history.

(56) References Cited

U.S. PATENT DOCUMENTS

| | | | |
|---|---|---|---|
| 2,166,208 A * | 7/1939 | Dayton | 280/513 |
| 2,178,094 A * | 10/1939 | Berluti | 280/513 |
| 2,523,500 A * | 9/1950 | Davey et al. | 280/513 |
| 2,823,931 A * | 2/1958 | Schrader | 280/513 |
| 3,595,527 A | 7/1971 | Douglass | |
| 3,724,875 A | 4/1973 | Hillman | |
| 3,794,356 A * | 2/1974 | Hollis, Jr. | 280/513 |
| 3,830,580 A | 8/1974 | Slattery et al. | |
| 3,841,663 A | 10/1974 | Proffit | |
| 3,851,855 A | 12/1974 | Douglass | |
| 3,863,894 A | 2/1975 | Mansi et al. | |
| 3,873,131 A | 3/1975 | Adams | |
| 3,921,958 A | 11/1975 | Brockelsby et al. | |
| 3,944,259 A | 3/1976 | Miller | |
| 3,997,191 A | 12/1976 | Morgan | |
| 4,017,977 A | 4/1977 | Light et al. | |
| 4,169,579 A | 10/1979 | Moll | |
| 4,283,073 A | 8/1981 | Gostomski et al. | |
| 4,352,505 A | 10/1982 | Chambers | |
| 4,527,925 A * | 7/1985 | Bauer et al. | 403/143 |
| 4,623,125 A | 11/1986 | Ebey | |
| 4,718,690 A | 1/1988 | Baker | |
| 4,763,917 A | 8/1988 | Chambers | |
| D298,676 S | 11/1988 | Chambers | |
| D304,818 S | 11/1989 | Chambers | |
| 4,889,357 A | 12/1989 | Perry | |
| 5,009,445 A | 4/1991 | Williams, Jr. | |
| 5,011,119 A | 4/1991 | Harrington | |
| 5,067,692 A | 11/1991 | Nudd et al. | |
| 5,072,964 A | 12/1991 | Schule | |
| 5,282,605 A | 2/1994 | Sauber | |
| 5,435,523 A | 7/1995 | Hylng et al. | |

(Continued)

*Primary Examiner*—Kevin Hurley
(74) *Attorney, Agent, or Firm*—Gordon & Rees, LLP (57) ABSTRACT

A new and improved trailer coupler which is spring loaded, and connected to the hitch ball of a towing vehicle is provided. Moreover, the new and improved trailer coupler has a latch activated from the top of the trailer coupler that is connected to a means for grasping and securing the hitch ball on a tow vehicle such that the trailer coupler does not unhitch from the ball of the tow vehicle. Further, the present invention provides a new and improved trailer coupler having a latch apparatus that facilitates engagement and disengagement of the trailer coupler to the hitch ball of the tow vehicle wherein the latch apparatus has a secondary locking mechanism in the form of a locking pin wherein the locking pin is placed in a position within the latch apparatus wherein the locking pin penetrates an opening within the latch such that the latch apparatus may not be manually or accidentally unlatched without prior removal of the locking pin.

12 Claims, 7 Drawing Sheets

U.S. PATENT DOCUMENTS

| | | |
|---|---|---|
| 6,302,381 B1 | 10/2001 | Roll |
| 6,505,849 B1 * | 1/2003 | Ebey .......................... 280/513 |
| 6,581,952 B1 | 6/2003 | Mackarvich |
| 6,588,790 B2 * | 7/2003 | Hall ........................... 280/513 |
| 6,904,926 B2 | 6/2005 | Aylward et al. |
| 2004/0135345 A1 | 7/2004 | Roll et al. |

* cited by examiner

TRAILER COUPLER

BACKGROUND OF THE INVENTION

1. Field of the Invention

This invention generally relates to the field of trailer couplers. More particularly, the present invention relates to a device that couples a trailer to a hitch ball of a towing vehicle. Further, the invention relates to an improved device that allows for the coupling of a towed trailer to a hitch ball on a towing vehicle. The present invention relates to an improved trailer coupler with a unique latching system and a unique locking system that secures the towed trailer and that prevents accidental and unintentional disengagement of the trailer from the hitch ball of a towing vehicle. Moreover, the present invention relates to a trailer coupler that may not disengage from the hitch ball of a tow vehicle without completely unlocking the trailer coupler.

2. Description of the Prior Art

The numbers of trailers that are currently towed behind vehicles has greatly increased with the acceptance and increase of Sport Utility Vehicles and recreation vehicles. This allows greater vacation and leisure choices to consumers. The amount of recreation vehicles such as motorcycles, small boats, large boats, jet skis, and other types of recreation vehicles and the like have become relatively commonplace in today's leisure based atmosphere. Many people take these recreation vehicles and/or sport vehicles to a destination for vacations, on weekends, or holidays. However, most of these recreational vehicles must be towed to their point of destination before they may be utilized for their intended purpose. Many individuals have acquired towing vehicles that allow them to tow their recreational devices to their point of destination. Many of these vehicles such as trucks or sport utility vehicles, have built-in towing balls and/or hitches straight from the manufacturer. However, in order to connect the towing vehicles to the device to be transported, it is necessary to coupler the towing vehicle to the transported device. A common type of coupling system that has evolved includes a hitch ball on the towing vehicle and a coupler on the trailer with jaws gripping the ball. However, a problem with this gripping system is that the individual can never be quite sure that the gripping system has properly engaged the hitch ball and that the system will not disengage from the hitch ball.

Another method that has been used to couple a towing vehicle to the desired towed device has been mating a socket receiver to a hitch ball. A popular variety uses a long, vertical sheathing attached to a female portion of the coupler, often referred to as gooseneck couplers. These types of couplers are often mated to a hitch ball mounted to a towing vehicle. In operation, a trailer with a gooseneck attachment is positioned over the ball and lowered onto the ball. The socket receiver should have a slightly larger diameter than the ball so that the receiver fully engages or mates with the ball. Generally, once the trailer is mated to the vehicle, a separate manual operation must be performed to ensure that the ball is locked into the receiving socket so that the receiver is no longer free to disengage from the ball.

A problem with this type of prior art coupler is that it involves multiple steps to ensure proper engagement, and even then the coupler may not be adequately locked about the ball, which leads to potentially dangerous situations where the trailer disengages while being towed.

Furthermore, in the prior art standard trailer hitches that use a similar mating system of a hitch ball attached to the rear of a vehicle, such as behind or on the rear bumper, these vehicles require the locking mechanism to also act as a support mechanism and often also a pulling function. These prior art trailer couplers are often difficult to lock and unlock and securing the absolute locking position is tenuous at best.

To solve this problem, many trailer couplers have a secondary locking system that requires the user to use a separate manual operation to lock the device when the ball and coupler have been latched together. If a person fails to lock the device, then a potentially dangerous situation of disengagement of the coupler may occur.

Thus, a need therefore exists for an improved trailer coupler that has a locking mechanism that ensures proper locking of the hitch ball before the latch may be secured. Moreover, a need exists for an improved trailer coupler that has an efficient, sleek design, but still incorporates a latching and locking system to secure a trailer to a towing vehicle.

SUMMARY OF THE INVENTION

The present invention provides a new and improved trailer coupler which is spring loaded, and secured to the hitch ball of a towing vehicle. Moreover, the present invention is a new and improved trailer coupler that has a latch that may be activated from the top of the coupler to secure about the hitch ball of a tow vehicle such that the trailer coupler does not disengage from the hitch ball of the tow vehicle. Further, the present invention provides a new and improved trailer coupler having a grasping means to engage and disengage the hitch ball of the tow vehicle wherein the grasping means may additionally be secured with a manual locking pin being placed through the latch apparatus. When the locking pin is placed through the latch apparatus, the latch apparatus may not be manually or accidentally unlatched without prior removal of the locking pin.

To this end, in an embodiment of the present invention, a trailer coupler to connect to a hitch ball of a towing vehicle is provided. The trailer coupler has a front portion of the trailer coupler having a latch attached thereto and a grasping means for grasping the hitch ball of the towing vehicle. Moreover, the trailer coupler has a ball receiving cavity positioned within the trailer coupler wherein said hitch ball of said towing vehicle is received in said ball receiving cavity of the trailer coupler. Further, the device has a spring housing having a spring positioned thereon wherein the spring acts on the latch of the trailer coupler. Moreover, the device has a spring housing having a spring positioned thereon and a locking pin for securing the latch when the latch is in the engaged or closed position.

In an embodiment, the trailer coupler device further has a grasping means that is a slidable abutment which moves from a non-inclusive position within the ball receiving cavity to an inclusive position within the ball receiving cavity to engage the hitch ball of the tow vehicle.

In an embodiment, the trailer coupler device has a grasping means that is a slidable abutment moving from a non-inclusive position within the ball receiving cavity when the latch is disengaged, to an inclusive position within the ball receiving cavity when the latch is engaged.

In an embodiment, the trailer coupler device has a spring housing having a spring wherein said spring is compressed when the latch is in a disengaged or open position.

In an embodiment, the trailer coupler device has a spring housing having a spring wherein the spring is released from a compressed state when the latch is in an engaged or closed position.

In an embodiment, the trailer coupler device has a trailer coupler having a first opening and a second opening thereon wherein the locking pin may enter from the first opening on a first side of the trailer coupler and further wherein the locking pin may exit via the second opening on a second side of the trailer coupler.

In an embodiment, the trailer coupler device has a trailer coupler having a first opening and a second opening thereon and said latch having a first opening and a second opening thereon wherein the locking pin may enter from the first opening on a first side of the trailer coupler, passes through the first opening on the latch. Further, the locking pin may exit via the second opening on a second side of the trailer coupler after passing through the second opening on said latch.

In an embodiment, the trailer coupler device has a latch having connection shaft connected thereto to connect the latch to the grasping means wherein the connection shaft has an opening thereon and further wherein the locking pin penetrates the opening on the connection shaft when the latch is in the closed or engaged position.

In an embodiment, the trailer coupler device has a trailer coupler having a first opening and a second opening thereon. The latch has a first opening and a second opening thereon and the trailer coupler having a connection shaft wherein the connection shaft attaches the latch to said grasping means. The connection shaft has an opening thereon. The locking pin passes through the first opening on a first side of the trailer coupler, passes through the first opening on the latch and the opening on said connection shaft and further wherein the locking pin may exit via said second opening on a second side of the trailer coupler after passing through said second opening on said latch.

In an embodiment, the trailer coupler device has a latch that may not be accidentally or intentionally opened without first removing the locking pin from the first and second openings on the trailer coupler, the first and second openings on the latch and the opening on the connection shaft.

In an embodiment of the present invention, a trailer coupler device for attaching to the hitch ball of a tow vehicle is provided. The trailer coupler has a front portion of the trailer coupler having a latch attached thereto wherein said latch is connected to a connection shaft. Moreover, the trailer coupler has a grasping means for grasping the hitch ball of the towing vehicle and a ball receiving cavity positioned within the trailer coupler wherein said hitch ball of said towing vehicle is received in said ball receiving cavity of the trailer coupler. Additionally, the trailer coupler has a spring housing having a spring positioned thereon wherein said spring acts in response to the movement of the latch and further wherein said coupler has a locking pin for securing the latch when the latch is in the engaged position.

In an embodiment, the trailer coupler device has a grasping means that is a slidable abutment that moves from a non-inclusive position within the ball receiving cavity when the latch is in the open position, to an inclusive position within the ball receiving cavity when the latch is in the closed position.

In an embodiment, the trailer coupler device has a spring housing that with a spring positioned thereon wherein said spring is compressed when said latch is in a disengaged or open position and further wherein said spring is released from a compressed state when the latch is in an engaged or closed position.

In an embodiment, the trailer coupler device has a trailer coupler having a first opening and a second opening thereon; said latch having a first opening and a second opening thereon and said trailer coupler having a connection shaft wherein said connection shaft attaches said latch to said grasping means wherein said connection shaft has an opening thereon and the locking pin passes through the first opening on a first side of the trailer coupler, passes through the first opening on said latch and said opening on said connection shaft and further wherein said locking pin may exit via said second opening on a second side of the trailer coupler after passing through said second opening on said latch.

In an embodiment of the present invention, a method for using a trailer coupler device is provided. The method comprises the steps of: providing a trailer coupler having a front portion adapted to accept a hitch ball from a tow vehicle wherein said trailer coupler has a ball receiving cavity; integrating a latch portion onto said trailer coupler wherein said latch portion is connected to a connection shaft; connecting said connection shaft to a slidable grasping means wherein said grasping means secures the hitch ball of a tow vehicle within the ball receiving cavity; integrating a spring housing within the trailer coupler to allow slidable movement of the grasping means; and providing a locking pin to secure the latch in the engaged or closed position.

In an embodiment, the method further comprises the step of: providing a spring within the spring housing wherein said spring is compressed when said latch is in the open or disengaged position.

In an embodiment, the method further comprises the step of: placing the hitch ball of the tow vehicle into the ball receiving cavity of the trailer coupler.

In an embodiment, the method further comprises the step of: fastening the latch into a closed or engaged position after insertion of the hitch ball into the ball receiving cavity of the trailer coupler wherein said closing of the latch causes the connection shaft to slide downward which causes said spring housing to act on a spring which decompresses and moves said grasping means into a position to secure the hitch ball of the tow vehicle.

In an embodiment, the method further comprises the step of: securing the latch in the closed or engaged position and ensuring that said latch does not disengage causing disengagement of the grasping means from the hitch ball wherein a locking pin is used to secondarily lock the latch into the closed position wherein said trailer coupler has a first opening and a second opening thereon; said latch having a first opening and a second opening thereon and said trailer coupler having a connection shaft wherein said connection shaft attaches said latch to said grasping means wherein said connection shaft has an opening thereon; said locking pin passing through said first opening on a first side of the trailer coupler, passes through said first opening on said latch and said opening on said connection shaft and further wherein said locking pin may exit via said second opening on a second side of the trailer coupler after passing through said second opening on said latch.

In an embodiment, the method further comprises the step of: unfastening the latch into an open or disengaged position wherein said opening of the latch causes the connection shaft to slide upward which in turn causes said spring housing to act on a spring which compresses and moves said grasping means into a position away from the hitch ball of the tow vehicle which in turn allows for release of the hitch ball of the tow vehicle from the trailer coupler.

It is, therefore, an object of the present invention to provide a trailer coupler apparatus and a method of using the same.

Another object of the present invention is to provide a trailer coupler apparatus and a method for using the same, for use by towing vehicles.

Still another object of the present invention is to provide trailer coupler apparatus and a method for using the same wherein the trailer coupler may be used to attach a tow vehicle to a trailer.

Yet another object of the present invention is to provide a trailer coupler apparatus and a method for using the same wherein the trailer coupler apparatus may be used to tow a boat, a vehicle, a container or any other device necessitating towing.

Still another object of the present invention is to provide a trailer coupler apparatus and a method for using the same wherein the trailer coupler has a streamlined aerodynamic design.

Another object of the present invention is to provide a trailer coupler apparatus and a method for using the same wherein the trailer coupler may be a one-piece apparatus.

Still another object of the present invention is to provide a trailer coupler apparatus and a method for using the same wherein the trailer coupler may be a two-piece apparatus.

A further object of the present invention is to provide a trailer coupler apparatus and a method for using the same wherein the trailer coupler may be streamlined and un-intrusive.

Yet another object of the present invention is to provide a trailer coupler apparatus and a method for using the same wherein the trailer coupler apparatus may endure high loads.

Another object of the present invention is to provide trailer coupler apparatus and a method for using the same wherein the trailer coupler apparatus may be easily manufactured and marketed.

Yet another object of the present invention is to provide a trailer coupler apparatus and a method for using the same wherein the trailer coupler apparatus may be more durable and reliable than existing known prior art.

Another object of the present invention is to provide a trailer coupler apparatus and a method for using the same wherein the trailer coupler apparatus may have a grasping means thereon to facilitate easier connection of the trailer coupler apparatus to the ball of a tow vehicle.

Still another object of the present invention is to provide a trailer coupler apparatus and a method for using the same wherein the trailer coupler apparatus may have a latching means that activates a spring loaded housing that fastens the trailer coupler to the ball of a tow vehicle.

An object of the present invention is to provide a unique trailer coupler apparatus and a method for using the same wherein the trailer coupler apparatus may connect to a plurality of hitch ball types and sizes known in the towing industry.

A further object of the present invention is to provide a trailer coupler apparatus and a method for using the same wherein the trailer coupler may have a latching apparatus that has a connection shaft that may connect to the grasping means wherein the connection shaft has an opening thereon.

Still another object of the present invention is to provide a trailer coupler apparatus and a method for using the same wherein the trailer coupler may have a latching apparatus that has a connection shaft that may connect the latch to the grasping means wherein the connection shaft has an opening thereon which when the latch is closed may be used to secure the latch and the trailer coupler from accidental disengagement.

Still another object of the present invention is to provide a trailer coupler apparatus and a method of using the same wherein the trailer coupler may have a spring housing having a spring and a connection shaft which may be connected to the latch at a first end and may connect to the grasping means on a second end.

Yet another object of the present invention is to provide a trailer coupler apparatus and a method for using the same wherein the new and improved trailer coupler apparatus may prevent accidental disengagement of the device from the tow vehicle.

Another object of the present invention is to provide a trailer coupler apparatus and a method for using the same wherein the trailer coupler apparatus may have a secondary locking means to secure the trailer coupler to the tow vehicle.

Yet another object of the present invention is to provide a trailer coupler apparatus and a method for using the same wherein the trailer coupler apparatus may have a second locking means wherein the secondary locking means may be a manually inserted locking pin.

Yet another object of the present invention is to provide a trailer coupler apparatus and a method for using the same wherein the trailer coupler apparatus may have a secondary locking means wherein the secondary locking means may be a manually inserted locking pin wherein the locking pin may be inserted into the trailer coupler apparatus to minimize accidental disengagement of the trailer coupler from the tow vehicle.

Another object of the present invention is to provide a trailer coupler apparatus and a method for using the same wherein the trailer coupler apparatus may have a secondary locking means wherein the secondary locking means may be inserted into the trailer coupler and may penetrate through an opening on the latch and exit on the opposing side of the trailer coupler.

An object of the present invention is to provide a trailer coupler apparatus and a method for using the same wherein the trailer coupler apparatus may have a secondary locking means wherein the secondary locking means may secure the latch such that the latch may not be accidentally opened without first removing the secondary locking means.

Yet another object of the present invention is to provide a trailer coupler apparatus and a method for using the same wherein the trailer coupler apparatus may have a secondary locking means wherein the secondary locking means is inserted into an opening on the connection shaft of the trailer coupler wherein the connection shaft may be directly connected to the latch and the latch may not be accidentally disengaged without first removing the secondary locking means from the connection shaft of the coupler.

Another object of the present invention is to provide a trailer coupler apparatus and a method of using the same wherein the trailer coupler may have a latch portion wherein a locking pin is used to secure the latch portion against accidental opening and/or unsecuring of the trailer coupler from the tow vehicle.

An object of the present invention is to provide a trailer coupler apparatus and a method of using the same wherein the trailer coupler may have a latch portion wherein a locking pin is used to secure the latch portion wherein the latch may not open without first removing the locking pin.

Another object of the present invention is to provide a trailer coupler apparatus and a method of using the same wherein the locking pin may have a protruding retractable ball on a distal end wherein the retractable ball may be larger than the opening in the trailer coupler such that the retractable ball may prevent accidental release of the locking pin from the trailer coupler Yet another object of the present invention is to provide a trailer coupler and a method of using the same wherein the trailer coupler may have a secondary locking means wherein the locking means may be constructed of high strength metal.

Still another object of the present invention is to provide a trailer coupler and a method of using the same wherein the trailer coupler may have a secondary locking means wherein the locking means may be constructed of a high strength material.

A further object of the present invention is to provide a trailer coupler apparatus and a method for using the same wherein the trailer coupler apparatus may be constructed from a high strength metal.

Another object of the present invention is to provide a trailer coupler apparatus and a method for using the same wherein the trailer coupler apparatus may be made of a high strength material.

A further object of the present invention is to provide a trailer coupler apparatus and a method for using the same wherein the trailer coupler may decrease the chance of accidental opening of the latch by a user.

Yet another object of the present invention is to provide a trailer coupler apparatus and a method for using the same wherein the trailer coupler is efficient and easy to engage on a towing vehicle.

An object of the present invention is to provide a trailer coupler apparatus and a method for using the same wherein the outside portion of the trailer coupler is flush and streamlined.

Another object of the present invention is to provide a trailer coupler apparatus and a method for using the same wherein the outside portion of the trailer coupler is flush and streamlined wherein all sides are smooth and even without protrusions.

Still another object of the present invention is to provide a trailer coupler apparatus and a method for using the same wherein the trailer coupler may have a plurality of locking pins to secure the latch during use.

Another object of the present invention is to provide a trailer coupler apparatus and a method for using the same wherein the trailer coupler may have a single locking pin to secure the latch during use.

An object of the present invention is to provide a trailer coupler apparatus and a method for using the same wherein the device may have a locking pin that interrupts the accidental release of the latch portion by being inserted into the latch portion.

Yet another object of the present invention is to provide a trailer coupler apparatus and a method for using the same wherein the trailer coupler apparatus may have a locking pin that interrupts the accidental release of the latch portion by being inserted just above the latch portion such that the latch portion's upward movement is blocked by the locking pin.

Another object of the present invention is to provide a trailer coupler apparatus and a method for using the same wherein the trailer coupler apparatus may be used on standard type hitch balls attached to the rear of a vehicle.

A further object of the present invention is to provide a trailer coupler apparatus and a method for using the same wherein the trailer coupler apparatus may use a grasping means to secure the trailer coupler to the hitch ball of a tow vehicle wherein said grasping means is connected to the spring housing which contains a spring thereon.

Still another object of the present invention is to provide a trailer coupler apparatus and a method for using the same wherein the trailer coupler apparatus may have a spring housing with a spring contained thereon wherein the spring forces the latch closed.

Another object of the present invention is to provide a trailer coupler apparatus and a method for using the same wherein the trailer coupler apparatus may have a spring housing and a spring positioned thereon wherein the latch may have a flat radius at the distal end of the latch which engages with the top end of the ball receiving cavity and is flush with the top end to keep the latch in the open position and the spring in the compressed position.

Yet another object of the present invention is to provide a trailer coupler apparatus and a method for using the same wherein the trailer coupler apparatus may have a spring housing and a spring positioned thereon wherein the latch is secured in a closed position by the spring when the spring is decompressed wherein the spring forces the latch closed.

Yet another object of the present invention is to provide a trailer coupler apparatus and a method for using the same wherein the trailer coupler apparatus may use a hydraulic mechanism to secure the trailer coupler to the hitch ball of the tow vehicle.

Another object of the present invention is to provide a trailer coupler apparatus and a method for using the same wherein the trailer coupler apparatus may use an electronic mechanism to secure the trailer coupler to the hitch ball of the tow vehicle.

An object of the present invention is to provide a trailer coupler apparatus and a method for using the same wherein the trailer coupler apparatus may use a pneumatic mechanism to secure the trailer coupler to the hitch ball of the tow vehicle.

Still another object of the present invention is to provide a trailer coupler apparatus and a method for using the same wherein the trailer coupler apparatus may be manufactured with a plurality of load capacities depending on the strength requirements of the article to be towed.

Still another object of the present invention is to provide a trailer coupler apparatus and a method for using the same wherein the trailer coupler apparatus strength may be manufactured in a plurality of sizes depending on the requirements of the article to be towed, the vehicle used to tow and the strength necessary.

Yet another object of the present invention is to provide a trailer coupler apparatus and a method for using the same wherein the trailer coupler apparatus may be easily secured and unsecured to the standard hitch ball attached to the rear of a vehicle.

These and other objects of the invention will become more clear when one reads the following specification, taken together with the drawings that are attached hereto. The scope of protection sought by the inventors may be gleaned from a fair reading of the Claims that conclude this specification.

Additional features and objects of the present invention are described in, and will be apparent from, the detailed description of the presently preferred embodiments and from the drawings.

DESCRIPTION OF THE PREFERRED EMBODIMENT

Figure 1:
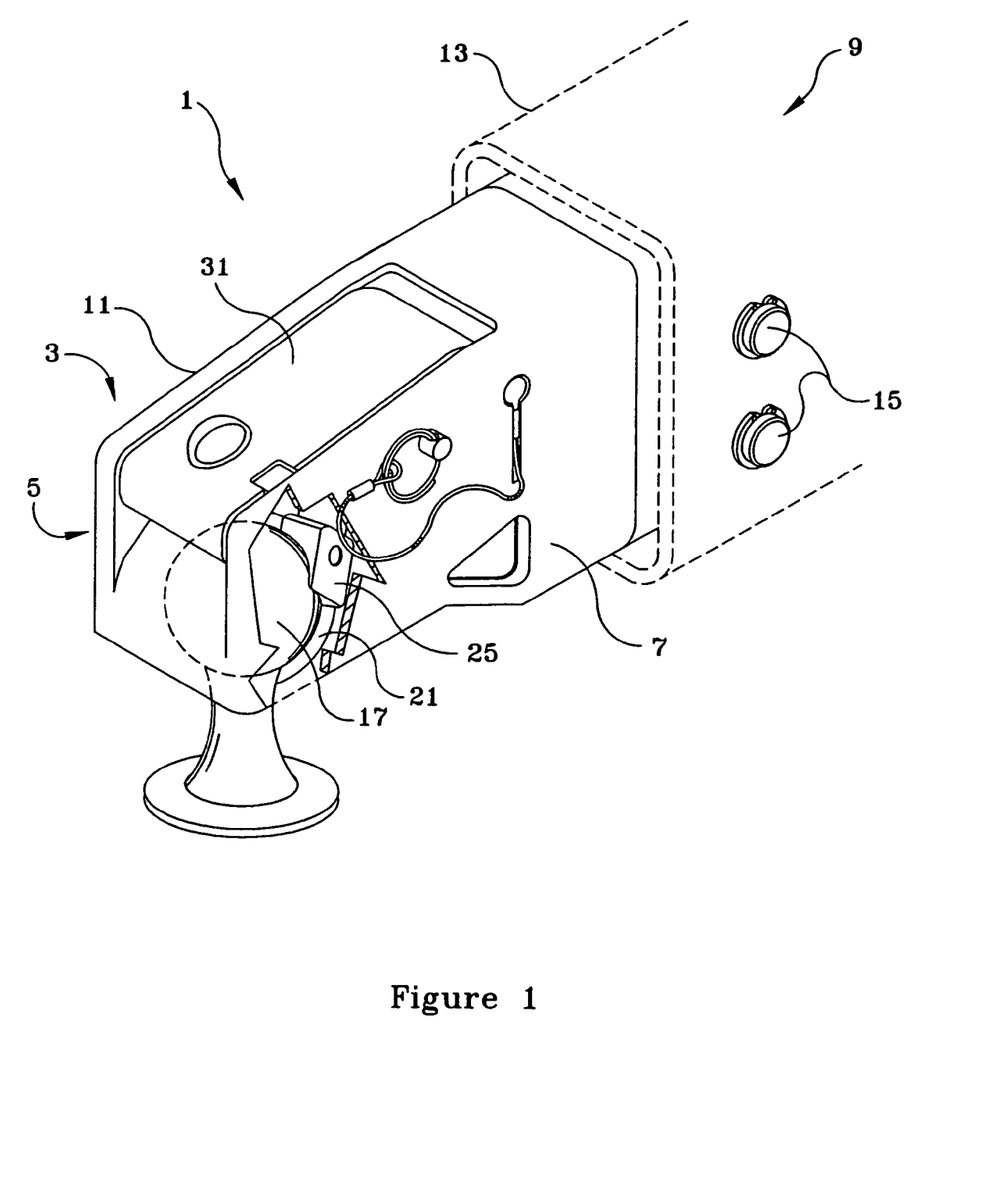
FIG. 1 is a perspective view of a trailer coupler in an embodiment of the invention.

Turning now to the drawings wherein elements are identified by numbers and like elements are identified by like numbers throughout the 8 figures, the invention is depicted in FIG. 1 and shows a trailer coupler apparatus 1 for allowing for attachment to a hitch ball of a tow vehicle (not shown). In a preferred embodiment of the present invention, the trailer coupler apparatus 1 may have a first side 3, a second side 5, a third side 7 and a fourth side 9. It should be understood that although a preferred embodiment of the present invention illustrates a four sided object, the invention is in no way limited to a trailer coupler 1 having four sides and being in a rectangular shape. On the contrary, the invention includes inter alia, trailer coupler 1 that may be manufactured and used in a plurality of different shapes and sizes to accommodate various strength and towing applications. In a preferred embodiment, the trailer coupler application is for a standard hitch ball 17.

Figure 2:
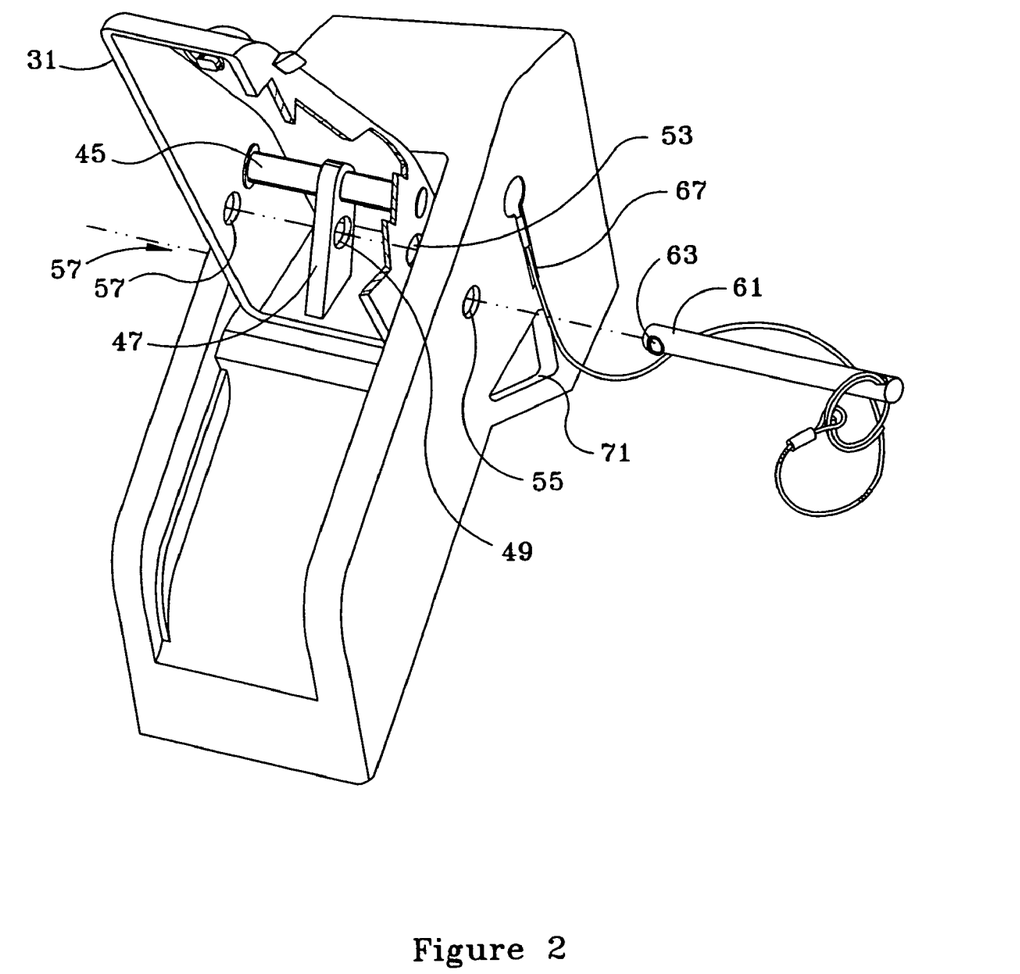
FIG. 2 is a perspective view of the front portion of a trailer coupler having an open latch in an embodiment of the invention.
Figure 3:
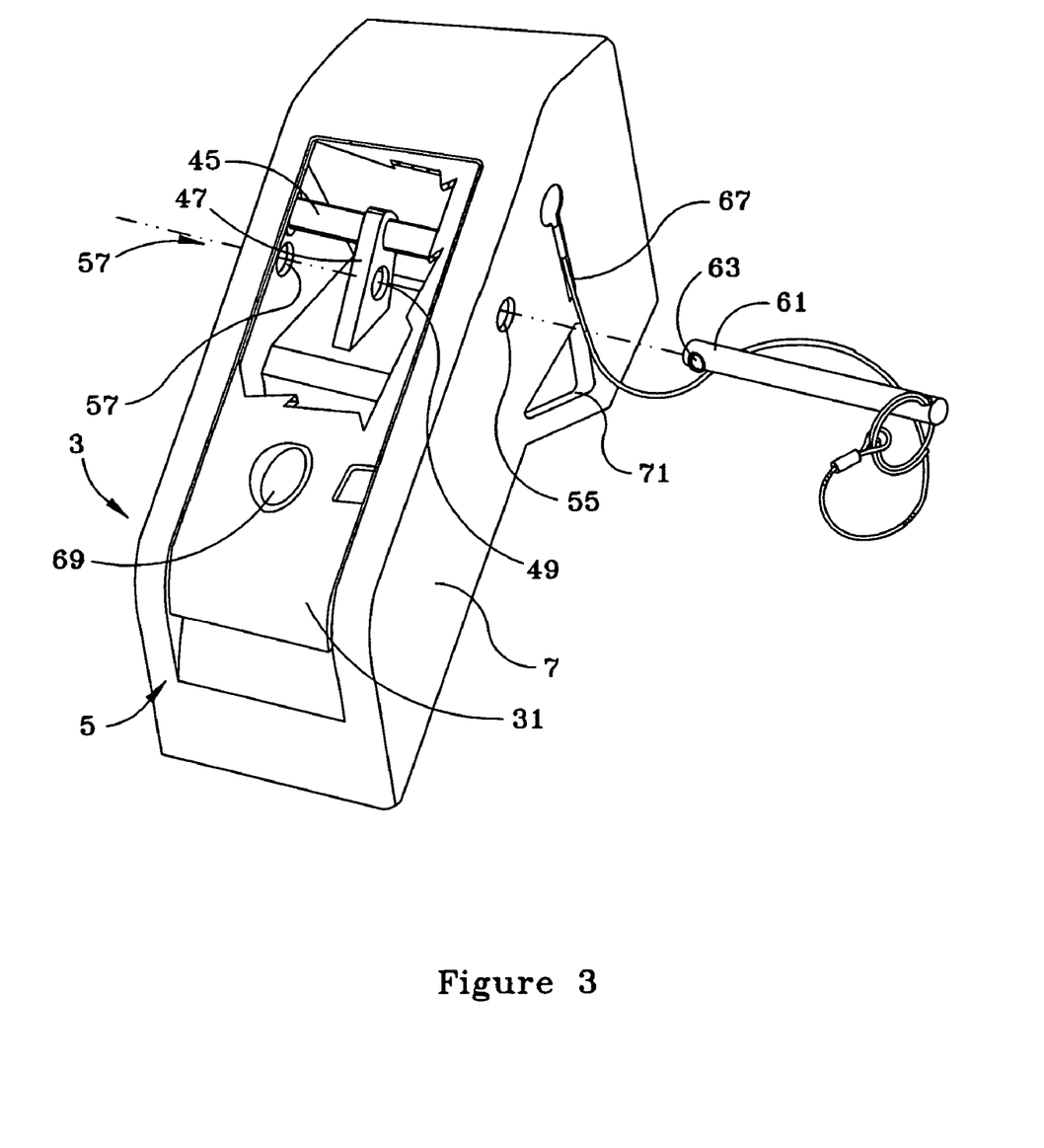
FIG. 3 is a perspective view of the front portion of a trailer coupler with a cutaway of the latch showing a closed latch and the path of locking pin inserted into the coupler in an embodiment of the invention.
Figure 8:
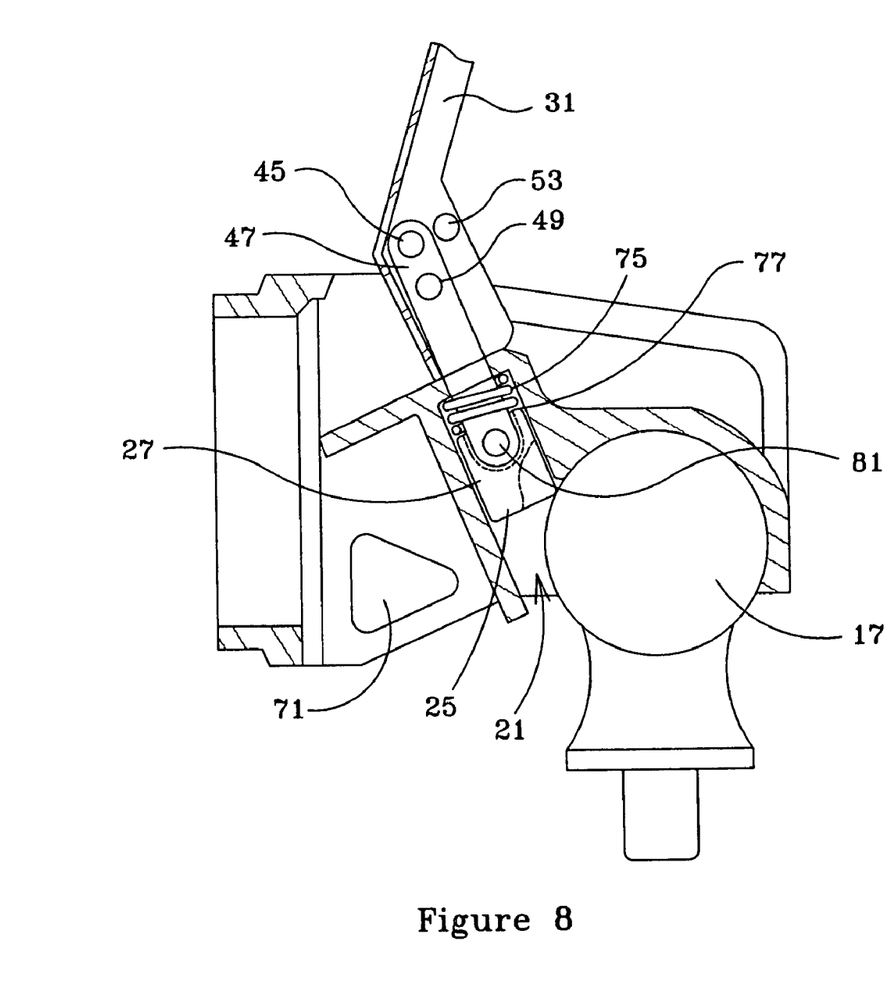
FIG. 8 is a cross sectional side view of the interior of the trailer coupler with the latch in the disengaged or open position in an embodiment of the present invention.
Figure 9:
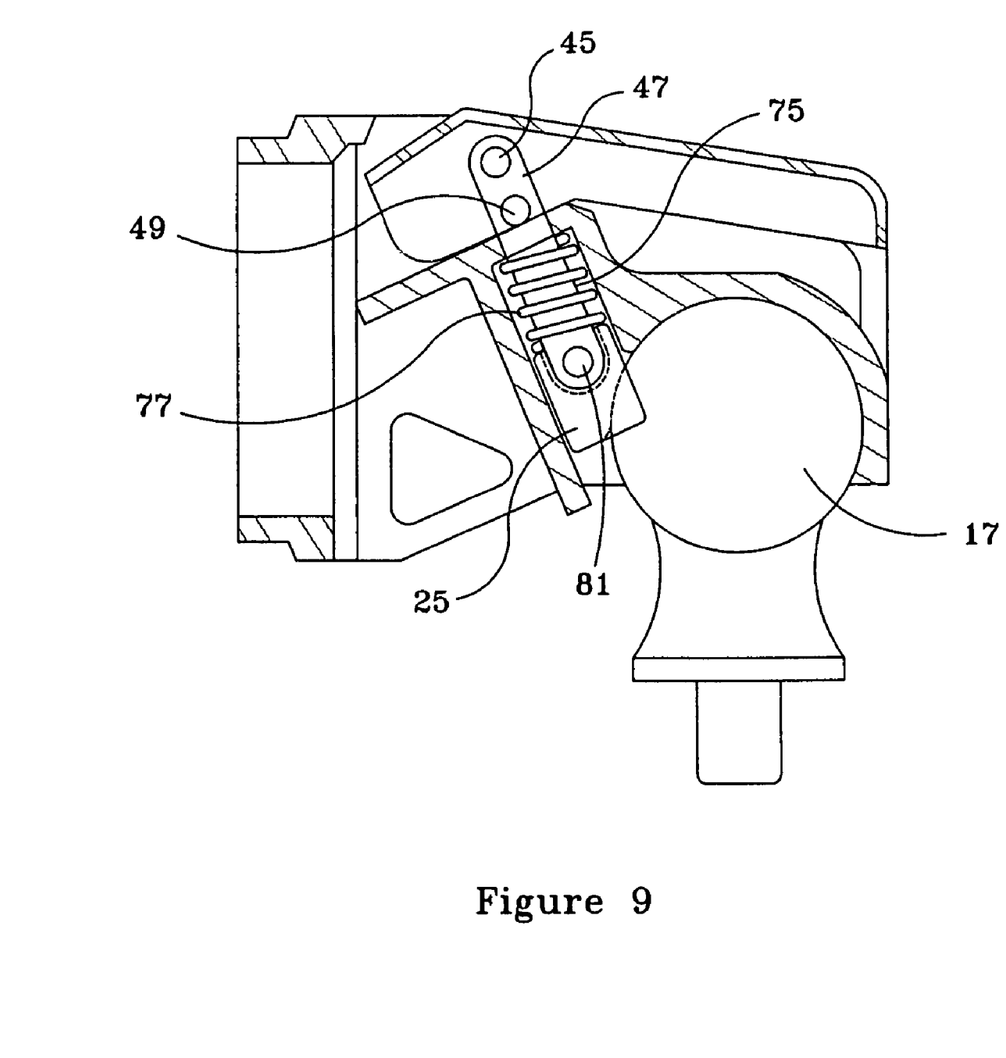
FIG. 9 is a cross sectional side view of the interior of the trailer coupler with the latch in the engaged or closed position in an embodiment of the present invention.

As illustrated in FIG. 1, the trailer coupler apparatus 1 may be constructed of two pieces, a first inner coupler portion 11, and a cover portion 13 that may cover the interior elements of the inner coupler portion 11. The cover portion 13 may be connected to the inner coupler portion 11 by a bolt 15 that secures the inner coupler portion 11 to the cover portion 13. In an embodiment, the cover portion 13 may be welded, pinned, or affixed by another means of connection to the inner coupler portion 11. The bolt 15 may be removably attached to the cover portion 13 and the inner coupler portion 11, such that if a problem arises inside the cover portion 13 or the inner coupler portion 11, the bolt 15 may be removed and the cover portion 13 may be disassociated from the inner coupler portion 11 to decipher any internal problems. In an embodiment, any releasable attachment means may be used to attach the inner coupler portion 11 to the cover portion 13. In another embodiment of the present invention, the trailer coupler 1 may be a single piece construction such that no cover portion 15 is necessary. FIGS. 1 and 8 also illustrate the trailer coupler having a ball receiving cavity 21 formed therein by a stationary and movable ball grip member. The ball receiving cavity 21 may be of sufficient size to accommodate a standard hitch ball 17 usually found on the rear of a towing vehicle (not shown). In an embodiment, the ball receiving cavity 21 may be of any size to accommodate a plurality of different hitch balls of differing sizes. Moreover, a grasping means 25 may protrude from a non-inclusive position 27 into an inclusive position 29 to secure about the hitch ball 17 as illustrated in FIGS. 8 and 9. The grasping means 25 may protrude from the non-inclusive position 27 to the inclusive position 29 when a latch 31 is engaged into a closed position as illustrated in FIG. 1 and FIG. 3. The latch 31 may be connected to a connection shaft 47 that controls the grasping means 25. When the latch 31 is in an open or disengaged position as illustrated in FIG. 2, the connection shaft 47 by position of the latch 31 causes the grasping means 25 to move from an inclusive position 29 within the ball receiving cavity 21 to a non-inclusive position 27 wherein when the grasping means 25 is in a non-inclusive position 27, the trailer coupler (1) may be disassociated from the hitch ball 17 of a tow vehicle. (Not shown.)

However, when the latch 31 of the trailer coupler 1 is in the closed position, the force on the connection shaft 47 by the position of the latch 31 causes the grasping means 25 to be in an inclusive position 29 whereby the grasping means 25 in conjunction with the ball receiving cavity 21 restrict the disengagement of the hitch ball 17 from the trailer coupler 1.

FIG. 2 illustrates a perspective view of the front portion of the trailer coupler 1 in an embodiment of the present invention. The front portion of the trailer coupler 1 may have a latch 31 to facilitate opening and closing of the grasping means 25 of within the ball receiving cavity 21. When the latch 31 is in the disengaged or open position, the grasping means 25 may be disengaged from the hitch ball 17 of the tow vehicle. However, when the latch 31 is in the engaged and/or closed position as shown in FIG. 3, the grasping means 25 may be engaged about the hitch ball 17 of the tow vehicle to secure the trailer coupler 1 to the hitch ball 17 of the tow vehicle. In an embodiment, the grasping means 25 may be a slidable abutment which may be spring loaded and attachable connected to the latch 31 via a connection shaft 47. The connection rod is attached to the latch 31 which when engaged, moves the grasping means 25 from a position non-inclusive position within the ball receiving cavity to an inclusive position within the ball receiving cavity 21.

FIG. 2 further illustrates the latch 31 which may have a stability rod 45 which may be attached to a connection shaft 47. The connection shaft 47 may be connected to the latch 31 by a stability rod 45 that may be integrated into the latch 31. However, the connection shaft 47 may be directly connected to the latch 31 without the need for a stability rod 45. In a preferred embodiment of the present invention, the connection shaft 47 may have an opening 49 thereon. The opening 49 may correlate to a first opening 53 on the latch 31 and to a second opening 51 on the latch 31. Moreover, the opening 49 may correlate to a first opening 55 on the trailer coupler 1 and a corresponding second opening 57 on the trailer coupler 1. In a preferred embodiment, a locking pin 61 may be used to secure the latch and the connected grasping means 25 in a fixed and safe position after engagement of the grasping means 25 about the hitch ball 17 of the tow vehicle. In an embodiment, the locking pin 61 may be inserted into the first opening 55 on the trailer coupler, having a corresponding first opening 51 on the latch 31. The locking pin 61 may then penetrate the opening 49 on the connection shaft 47, travel through the opening 49 of the connection shaft 47 and through the second opening 51 of the latch 31 and the corresponding second opening 57 of the trailer coupler 1. However, the locking pin 61 may not pass through the connection shaft 47 opening 49, unless the latch 31 is in the closed and/or engaged position. This ensures that the latch 31 is properly closed and the grasping means 25 is in an engaged position about the hitch ball 17 of the tow vehicle. Moreover, the locking pin 61 penetrating the connection shaft 47 of the trailer coupler 1 may ensure that the latch 31 is not accidentally disengaged and/or opened, and the corresponding grasping means 25 is not disengaged from the hitch ball 17. In an embodiment, the latch 31 may not be released and/or opened until the locking pin 61 has been removed from the trailer coupler 1. The locking pin 61 may have a retractable roller ball 63 on its end to keep the locking pin 61 secured about the second opening 57 of the trailer coupler 1. Moreover, the locking pin 61 may also have a tether 67 that secures the locking pin 61 to the trailer coupler 1 when the locking pin 61 is not in use.

FIG. 3 further illustrates the latch 31 of the trailer coupler 1 in its secured position. The latch 31 may be closed to lay flush with the top portion of the trailer coupler 1. The latch may also have a lever 69 thereon to facilitate opening and closing of the latch 31. In a preferred embodiment of the present invention, the lever 69 may be manually manipulated to facilitate opening and closing of the latch 31. However, in another embodiment, the lever 69 may be remotely operated.

FIG. 3 further illustrates a cut out view of the internal portion of the latch 31 illustrating the stability rod 45 and the connection shaft 47. Moreover, as described above, the locking pin 61 may be inserted into the first opening 55 on the trailer coupler 1 which corresponds to the opening 49 on the connection shaft 47 such that when fully engaged, the locking pin 61 secures the latch 31 in a closed and secured position. Even if the lever 69 is manually manipulated or is in some other way engaged to open, the locking pin 61 may prevent the latch 31 from disengaging or opening until the locking pin 61 is withdrawn from the trailer coupler 1. Additionally, in a preferred embodiment of the present invention, the locking pin may not be fully inserted into the trailer coupler including penetration of the connection shaft 47 opening 49 and the first and second openings 55, 57 of the trailer coupler 1 without the latch 31 being in a fully engaged position. This may ensure that the latch 31 is properly closed and the grasping means 25 is secured about the hitch ball 17 before a user improperly believes that the latch 31 and grasping means 25 is secure and inserts the locking pin 61 without properly securing the hitch ball 17 to the trailer coupler 1.

Figure 4:
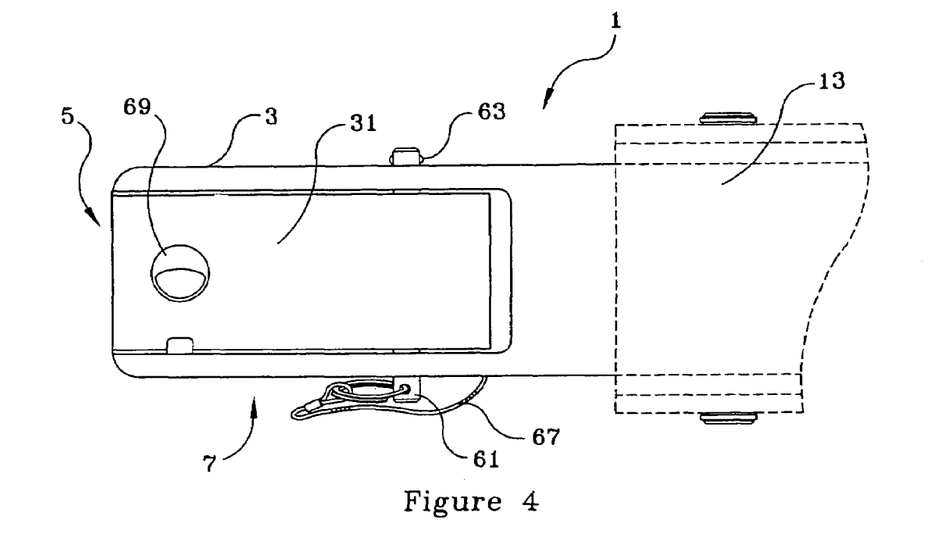
FIG. 4 is a top view of the front portion of the trailer coupler showing the inserted pin in an embodiment of the present invention.
Figure 5:
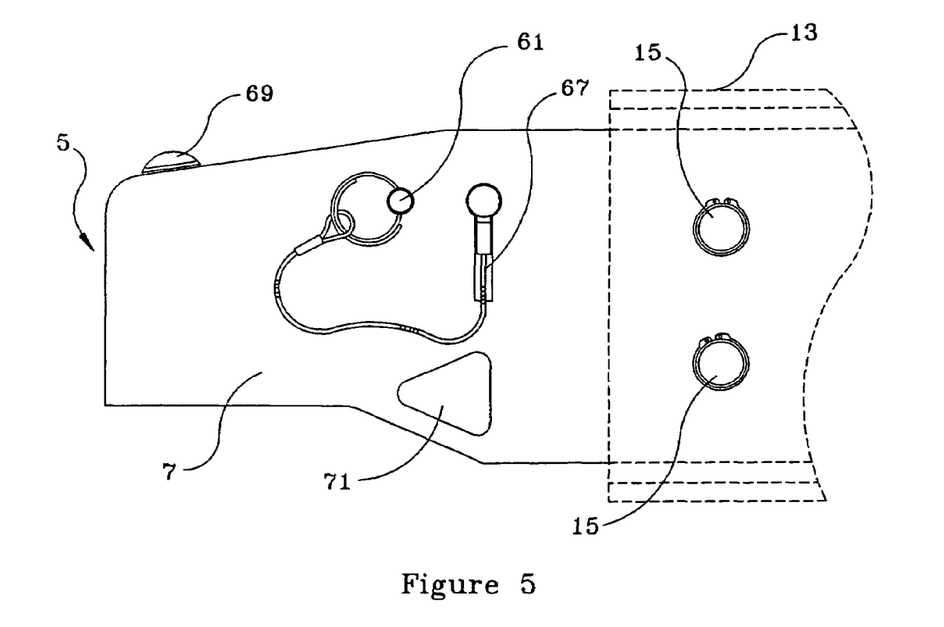
FIG. 5 is a side view of the front portion of the trailer coupler showing the inserted locking pin in an embodiment of the present invention.
Figure 6:
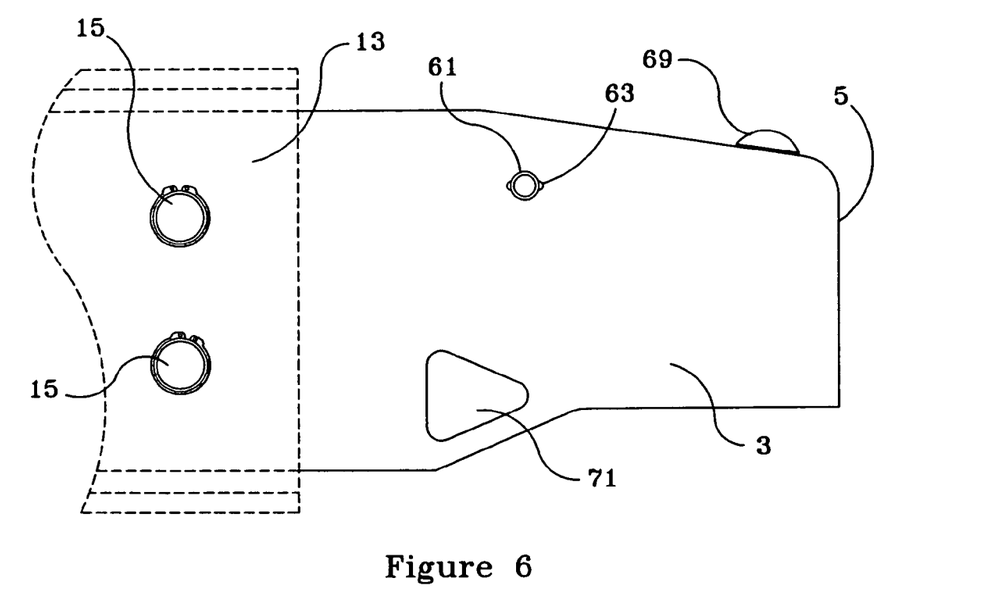
FIG. 6 illustrates a side view of the trailer coupler in an embodiment of the present invention.
Figure 7:
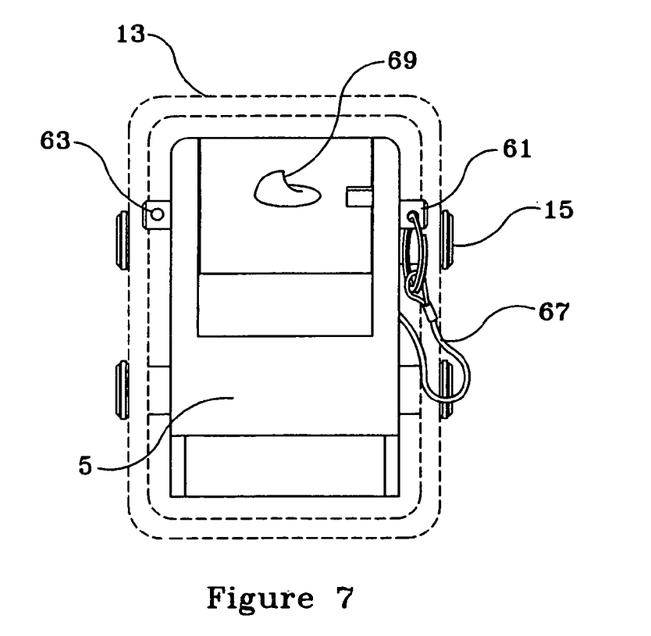
FIG. 7 is a front view of the trailer coupler in an embodiment of the present invention.

FIGS. 4-6 illustrate top and side views of the trailer coupler 1 wherein the latch 31 is in the secured and closed position and the locking pin 61 has been secured there through to lock the trailer coupler 1 such that the grasping means 25 does not disengage from the hitch ball 17 of a towing vehicle. FIG. 5 also illustrates a triangular opening 71 in the side portion of the trailer coupler 1. The triangular opening 71 may be used to additionally hang the loose end of the safety chains/cables to keep them off the ground and additionally secure the trailer coupler 1 to a tow vehicle. Many hitch mechanisms have a chain attached thereto and a second end of the chain has a hook attached. The hook may then be secured to the trailer coupler by hooking into the triangular opening 71 on the side of the trailer coupler 1 for additional security, such that accidental disengagement of the trailer coupler 1 from the hitch ball 17 occurs, the chain may prevent the article being towed from being completely left behind. Moreover, it may prevent hazardous situations wherein the article being towed is completely disengaged from the tow vehicle and presents a danger to any following vehicles.

FIG. 8 illustrates a cross-section side view of the trailer coupler 1 in an embodiment of the present invention. As previously mentioned, the trailer coupler 1 may have a ball receiving cavity 21 for engagement of a hitch ball 17 of a tow vehicle. The hitch ball 17 may fit into the ball receiving cavity 21 when the grasping means 25 is in a non-inclusive position within the ball receiving cavity 21. When the hitch ball 17 has been fully inserted into the ball receiving cavity 21, the grasping means 25 may be engaged by closing the latch 31 wherein the grasping means 25 is moved into the inclusive position within the ball receiving cavity 21. After the grasping means 25 has been moved into the inclusive position within the ball receiving cavity 21, the locking pin 61 may be inserted to secure that the grasping means is fully engaged and the hitch ball 17 is not accidentally disengaged from the trailer coupler 1.

FIG. 8 illustrates the interior of the trailer coupler 1. As illustrated, the trailer coupler 1 may have a latch 31 which is connected to a spring housing 75 by a connection shaft 47. The connection shaft 47 connects the latch 31 to the grasping means 25 which has a spring 77 mounted thereon. The spring 77 retracts and engages based on the position of the latch 31. The spring 77 may cause the latch 31 to be in a closed position by completely retracting into a state wherein the spring 77 is not being forced to compress. When significant pressure is put on the latch 31, it may cause compression of the spring 77 to open the latch 31 whereby the same force and/or pressure on the spring causes movement of the grasping means 25 in relation to the hitch ball 17. Moreover, attached to the connection shaft 47 is the grasping means 25. The grasping means 25 may be attached by a connecting pin 81 to the connection shaft 47. Additionally, FIG. 8 illustrates the latch 31 in the disengaged or open position wherein the spring 77 is compressed in association to the position of the latch 31 and the grasping means 25 is in the non-inclusive position in relation to the hitch ball 17. Moreover, a top plate 83 may be positioned on the top portion of the ball receiving cavity 21 wherein an associated planar portion 89 of the latch 31 may rest on the top plate 83 to allow for the latch 31 to remain open without the need for additional pressure and/or force when the latch 31 is in the disengaged or open position. Additionally the latch 31 may have curved portion 91 that may provide for efficient closing of the latch 31 when sufficient pressure and/or force is placed on the latch 31 which in turn may remove the planar portion 89 of the latch 31 from resting on the top plate 83 of the ball receiving cavity 21. FIG. 8 also illustrates an opening 53 in the latch 31, the opening 49 in the connection shaft 47 and the opening 55 in the trailer coupler 1 body when the latch 31 is in the disengaged or open configuration. As can be seen in the figures, when the latch 31 is in the open configuration, the opening 49 on the connection shaft 47 and the opening 55 in the trailer coupler 1 are misaligned and a locking pin 61 may not fit through the combination of the openings 49, 55.

FIG. 9 illustrates a cross sectional view of the interior of the trailer coupler 1 wherein the latch 31 is in a closed position. As illustrated, when the latch 31 is closed, the connection shaft 47 connected to the latch 31 causes the spring housing 75 to act on the spring 77 wherein the spring 77 is expanded. The expansion of the spring 77 causes the connected grasping means 25 to move from a non-inclusive position relative to the hitch ball 17 within the ball receiving cavity 21 to an inclusive position in a position adjacent the hitch ball 17 of the tow vehicle. Moreover, FIG. 9 illustrates the opening on the coupler 1 wherein the locking pin 61 is placed to lock the latch 31 in position such that the latch 31 may not be accidentally opened and/or disengaged causing the spring to compress and the grasping means 25 to be prematurely disengaged from the hitch ball 17.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A trailer coupler to connect to a hitch ball of a towing vehicle, comprising:

a front portion of the trailer coupler having a latch attached thereto;

a grasping means, slidingly engaged within a spring housing, for grasping the hitch ball of the towing vehicle;

a ball receiving cavity positioned within the trailer coupler wherein said hitch ball of said towing vehicle is received in said ball receiving cavity of the trailer coupler;

said spring housing located within the trailer coupler and having a spring positioned thereon wherein said spring acts on said grasping means to engage the hitch ball; and a locking pin for securing the latch when the latch is in the engaged position;

said trailer coupler having a first opening and a second opening thereon and said latch having a first opening and a second opening thereon wherein said locking pin may enter from said first opening on a first side of the trailer coupler, passes through said first opening on said latch and further wherein said locking pin may exit via said second opening on a second side of the trailer coupler after passing through said second opening on said latch.

2. The trailer coupler device as described in claim 1, further comprising:

said grasping means being a slidable abutment which moves from a non-inclusive position within the ball receiving cavity to an inclusive position within the ball receiving cavity to engage the hitch ball of the tow vehicle.

3. The trailer coupler device as described in claim 1, further comprising: said grasping means being a slidable abutment moving from a non-inclusive position within the ball receiving cavity when the latch is disengaged, to an inclusive position within the ball receiving cavity when the latch is engaged.

4. The trailer coupler device as described in claim 1, further comprising:

said spring housing having a spring wherein said spring is compressed when said latch is in a disengaged or open position.

5. The trailer coupler described in claim 1, further comprising:

said spring housing having a spring wherein said spring is released from a compressed state when the latch is in art engaged or closed position.

6. The trailer coupler described in claim 1, further comprising:

said trailer coupler having a first opening and a second opening thereon wherein said locking pin may enter from said first opening on a first side of the trailer coupler and further wherein said locking pin may exit via said second opening on a second side of the trailer coupler.

7. The trailer coupler device as described in claim 1, further comprising:

said latch having a connection shaft connected thereto to connect the latch to the grasping means wherein said connection shaft has an opening thereon and further wherein said locking pin penetrates said opening on said connection shaft when said latch is in the closed or engaged position.

8. The trailer coupler device as described in claim 1, further comprising:

said trailer coupler having a first opening and a second opening thereon; said latch having a first opening and a second opening thereon and said trailer coupler having a connection shaft wherein said connection shaft attaches said latch to said grasping means wherein said connection shaft has an opening thereon; said locking pin passing through said first opening on a first side of the trailer coupler, passes through said first opening on said latch and said opening on said connection shaft and further wherein said locking pin may exit via said second opening on a second side of the trailer coupler after passing through said second opening on said latch.

9. The trailer coupler device described in claim 8 wherein said latch may not be accidentally or intentionally opened without first removing the locking pin from the first and second openings on the trailer coupler, the first and second openings on the latch and the opening on the connection shaft.

10. A trailer coupler device for attaching to the hitch ball of a tow vehicle, said trailer coupler device comprising:

a front portion of the trailer coupler having a latch attached thereto wherein said latch is connected to a connection shaft;

a grasping means slidingly engaged within a spring housing and connected to the connection shaft for grasping the hitch ball of the towing vehicle;

a ball receiving cavity positioned within the trailer coupler wherein said hitch ball of said towing vehicle is received in said ball receiving cavity of the trailer coupler;

said spring housing located within the trailer coupler having a spring positioned thereon wherein said spring acts on the grasping means in response to the movement of the latch; and a locking pin for securing the latch when the latch is in the engaged position;

said trailer coupler having a first opening and a second opening thereon; said latch having a first opening and a second opening thereon and said trailer coupler having a connection shaft wherein said connection shaft attaches said latch to said grasping means wherein said connection shaft has an opening thereon;

said locking pin passing through said first opening on a first side of the trailer coupler, passes through said first opening on said latch and said opening on said connection shaft and further wherein said locking pin may exit via said second opening on a second side of the trailer coupler after passing through said second opening on said latch.

11. The trailer coupler described in claim 10 further comprising:

said grasping means being a slidable abutment that moves from a non-inclusive position within the ball receiving cavity when the latch is in the open position, to an inclusive position within the ball receiving cavity when the latch is in the closed position.

12. The trailer coupler described in claim 10 wherein said spring housing has a spring positioned thereon wherein said spring is compressed when said latch is in a disengaged or open position and further wherein said spring is released from a compressed state when the latch is in an engaged or closed position.

* * * * *